United States Patent Office 3,352,883
Patented Nov. 14, 1967

3,352,883
PRODUCTION OF DIACETONE-2-KETO-1-GULONIC ACID
Eitaro Hashii, Osaka, Japan, assignor to Takeda Chemical Industries, Ltd., Osaka, Japan
No Drawing. Filed Mar. 16, 1964, Ser. No. 352,326
Claims priority, application Japan, Mar. 16, 1963, 38/14,533
2 Claims. (Cl. 260—340.7)

This invention relates to an improvement in the production of diacetone-2-keto-1-gulonic acid. Diacetone-2-keto-1-gulonic acid can be produced by heating diacetone sorbose with an alkali metal halogenite while maintaining an alkaline pH in the presence of a catalyst such as oxides of nickel, cobalt and palladium.

The production of diacetone-2-keto-1-gulonic acid generally comprises the following unit processes:

(i) A process for the production of sodium diacetone-2-keto-1-gulonate by oxidation of diacetone sorbose.

(ii) A process for removing used catalyst from an aqueous solution of sodium diacetone-2-keto-1-gulonate (a process for removing used catalyst from the reaction mixture resulting from the above oxidation reaction).

(iii) A process for crystallizing diacetone-2-keto-1-gulonic acid as its monohydrate, which comprises neutralizing an aqueous solution of sodium diacetone-2-keto-1-gulonate by addition of acid.

(iv) A process for separating the resulting monohydrate from the solution.

(v) A process for separating the used catalyst from the reaction mixture and for reproducing the separated catalyst for the repeated uses.

For the production of diacetone-2-keto-1-gulonic acid, the abovementioned five processes must be carried out. In the hitherto known methods, however, these processes have been executed by batch methods. The reason why a continuous method comprising all processes mentioned above, which is desirable from an industrial point of view has never been adopted hitherto, may be ascribed to the fact that it has not been possible to combine side-procedure accompanying the above-mentioned five processes with the main five processes mentioned above so that the processes for production of diacetone-2-keto-1-gulonic acid may be carried out continuously.

Although many attempts were made to overcome the foregoing difficulties, none, as far as the present inventor is aware, was entirely, successful when carried into practice on an industrial scale.

It is the first object of the present invention to provide an improved method for the production of diacetone-2-keto-1-gulonic acid, in which side-procedures accompanying the five main processes are combined with those processes. The second object of the present invention is to provide a new continuous method for the production of diacetone-2-keto-1-gulonic acid. The invention also contemplates providing a new method for dealing with the side-procedures. Among the further objects of the present invention is the provision of improvements of the five main processes for the production of diacetone-2-keto-1-gulonic acid.

Other objects and advantages will become apparent from the following description and the examples.

Reference will be made to the present invention in detail in order of the main processes for the production of diacetone-2-keto-1-gulonic acid.

The oxidation reaction of diacetone sorbose in accordance with the present invention is carried out in an alkaline solution by heating with a suitable alkali metal hypohalogenite in the presence of a suitable catalyst. Among catalysts which have been found to be useful for this oxidation, there are the oxides, hydroxides or salts of cobalt, nickel, palladium and uranium, or the mixtures of two or more of the oxides, hydroxides or salts of those metals. Among the mixtures, the oxides or salts of nickel and cobalt (nickel:cobalt=7:3) are, above all, preferred.

It has been found that desirable results with respect to yields and reaction times can be obtained when the oxidation is conducted in the presence of the mixture of oxides or salts of nickel and cobalt. More concretely, in case a mixture of nickel chloride and cobalt chloride (the former:the latter=7:3) is put to use as the catalyst for the oxidation, the reaction time is reduced by half in comparison with the case of the sole use of the same amount of nickel chloride, and by one fifth in comparison with the case of the sole use of the same amount of cobalt chloride.

Sodium diacetone-2-keto-1-gulonate can be produced by the oxidation process. A difficult but important problem is how to separate the used catalyst from the reaction mixture and to make it possible to combine a preceding process with the next process continuously. As the catalyst exists in the state of particles in the reaction mixture, it is impossible to separate the catalyst from the mixture by such known procedures as filtration. This problem has been solved by adopting a disc type liquid-solid centrifugal subsider such as De Laval type centrifugal subsider.

However, even if a centrifugal subsider of such type was put to use only once, advantageous and preferable merit from the industrial point of view is not obtained, nor continuous procedures made possible. This is because not a little amount of sodium diacetone-2-keto-1-gulonate is contained in the sludge separated by the centrifugal subsider, and the sodium salt contained in the sludge is decomposed by mineral acid to be added for the recovery of the used catalyst, with the result of lowered yield of the objective product. Thus, the most important but difficult problem lies in the course of the separation and recovery of the used catalyst. However, this difficult problem has been solved by using two liquid-solid centrifugal subsiders (first and second) and by elaborating a device between two separation procedures. Namely, the sludge obtained by the separation procedure using the first centrifugal subsider is diluted with water continuously, and the resulting diluted sludge is subjected to a separation procedure by using the second centrifugal subsider. The sludge obtained by the second separation procedure contains hardly any sodium diacetone-2-keto-1-gulonate. Therefore the solution recovered from the sludge treated by mineral acid can be repeatedly put to use as the catalyst for the oxidation process without any disadvantage. Furthermore, the present invention is characterized by putting back the solution obtained by the second separation procedure to the solution comprising diacetone sorbose to be oxidized. Since the above-mentioned side-procedures have made it possible to combine the five main processes and to carry out the processes continuously and have brought about high yield of the product, without loss of the catalyst, those side-procedures are very preferable and advantageous for the production of diacetone-2-keto-1-gulonic acid from an industrial point of view.

The solution obtained by the first centrifugal separation procedure is led to a process for the crystallization of diacetone-2-keto-1-gulonic acid monohydrate, which comprises neutralizing the solution by addition of acid. For the neutralization, mineral acid must be added to the solution, because pH 1–2 is suitable for crystallization of diacetone-2-keto-1-gulonic acid monohydrate. However excessive acid brings about the decomposition of diacetone-2-keto-1-gulonic acid hydrate, with the result of lowered yield of the objective product. Therefore in accordance with the present invention, a reducing agent such as sodium hydrogensulfite is added to the solution together with mineral acid for neutralizing the excessive acid and also for decomposing the remaining alkali metal hypohalogenite.

The resulting crystals of the hydrate are separated out from the solution continuously.

As detailed above, in accordance with the present invention, the whole procedure for the production of diacetone-2-keto-1-gulonic acid, which have hitherto been carried out only by batch processes, can be carried out by a continuous process without loss of catalyst and the objective product can be obtained in high yield and in a short time, and therefore the method of the present invention is preferable and advantageous for the production of diacetone-2-keto-1-gulonic acid on an industrial scale.

For the purpose of giving those skilled in the art a better understanding of the invention, the following examples are given, but it is to be understood that these examples are given by way of illustration and not of limitation.

*Example 1*

35% aqueous solution of diacetone-1-sorbose, the solution separated by the second stage centrifugal subsider, 1.8% aqueous solution of nickel chloride and 9.5% aqueous solution of sodium hypochlorite are poured into a multiple stage reaction vessel at the flow-rare of 471 liters per hour, 770 liters per hour, 280 liters per hour and 1300 liters per hour, respectively. The temperature of each reaction vessel is kept at 50–60° C. during the reaction. The resulting reaction mixture is subjected to catalyst-separation procedure by the first stage centrifugal subsider. The obtained supernatant is led to the next process for crystallizing diacetone-2-keto-1-gulonic acid hydrate. To the sludge separated by the first stage centrifugal subsider is added water at the rate of 770 liters per hour. Thus obtained liquid is treated by the second stage centrifugal subsider in the same way as in the above-mentioned treatment by the first stage subsider. The obtained supernatant is put back in the first reaction system to be oxidized, and the sludge is led to the process for recovery of the used catalyst.

To the supernatant separated by the first stage centrifugal subsider is continuously added 20% aqueous solution of sodium hydrogensulfite at the rate of 2.5 liters per hour and then the solution is cooled to 0° C. by a heat exchanger. The cooled solution is led to the vessel for crystallizing diacetone-2-keto-1-gulonic acid hydrate and then 35% hydrochloric acid solution which was cooled in advance to 0° C., is added to the solution to adjust the pH at about 1.5.

The resulting crystals are collected by a centrifugal separater.

On the other hand, the sludge separated by the second centrifugal subsider is led to a multiple stage vessel for the recovery of the used catalyst, and then 35% hydrochloric acid solution is added to adjust the pH at about 2. The liquid is neutralized with 35% sodium hydroxide solution while its pH is adjusted at 4. Thus recovered catalyst is put back to the reaction system after the addition of water.

*Example 2*

35% aqueous solution of diacetone-1-sorbose, the solution separated by the second stage centrifugal subsider, about 1% aqueous solution of the catalyst (nickel chloride:cobalt chloride=7:3) and 9.5% aqueous solution of sodium hypochlorite are poured into a multiple stage reaction vessel at the flow-rate of 471 liters per pour, 600 liters per hour, 280 liters per hour and 1300 liters per hour, respectively.

The temperature of each reaction vessel is kept at 50–60° C. during the reaction. The resulting reaction mixture is subjected to catalyst-separation procedure by the first stage centrifugal subsider. To the sludge separated by the first stage centrifugal subsider is added water at the rate of about 600 liters per hour. And then the same treatment as in the Example 1 is carried out to obtain diacetone-2-keto-1-gulonic acid.

Having thus disclosed the invention, what is claimed is:

1. In a process for the production of diacetone-2-keto-1-gulonic acid, wherein diacetone sorbose is catalytically oxidized with an alkali metal hypohalogenite and the reaction mixture is subjected to centrifugal separation in successive centrifugal separation steps, the procedure comprising adding sodium hydrogensulfite and a mineral acid to the supernatant obtained by the first stage centrifugal separation of the reaction mixture resulting from the oxidation step of the diacetone sorbose.

2. A continuous process for the oxidative production of diacetone-2-keto-1-gulonic acid by oxidizing diacetone sorbose in water with an alkali metal hypohalogenite in the presence of a catalyst selected from the class consisting of oxides, hydroxides and salts of cobalt, nickel, palladium and uranium and mixtures thereof, which comprises (a) subjecting the reaction mixture resulting from the oxidation of the diacetone sorbose to a first stage centrifugal separation, (b) adding water to the sludge obtained from said first stage centrifugal separation, (c) thereafter subjecting the resultant diluted sludge to a second stage centrifugal separation, (d) returning the supernatant from step (c) to the reaction system, (e) recovering from the residual sludge obtained from the second stage centrifugal separation the catalyst contained therein, (f) returning the recovered catalysts for re-use in the oxidation of further amounts of diacetone sorbose, (g) cooling the supernatant obtained from the first stage centrifugal separation and then adding sodium hydrogensulfite and mineral acid thereto, and (h) recovering the resultant crystals of diacetone-2-keto-1-gulonic acid.

References Cited

UNITED STATES PATENTS 2,367,251   1/1945   Weijlard et al. _____ 260—340.7

OTHER REFERENCES

Balyakina et al.: Chemical Abstract, vol. 51, col. 7307 (19). (Abstract of article taken from Trudy. Vsesoyuz. Nauch, Issledovatel. Vitamin. Institute. vol. 5 (1954), pp. 17–21.)

ALEX MAZEL, *Primary Examiner.*

NICHOLAS S. RIZZO, *Examiner.*

J. H. TURNIPSEED, *Assistant Examiner.*